US009239574B2

(12) United States Patent
Tandon et al.

(10) Patent No.: US 9,239,574 B2
(45) Date of Patent: Jan. 19, 2016

(54) APPARATUS FOR AUTOMATING FIELD DEVICE OPERATIONS BY CAPTURING DEVICE METHOD EXECUTION STEPS FOR LATER USE AND RELATED METHOD (75) Inventors: Vibhor Tandon, Bangalore (IN); Gowtham Anne, Singapore (SG)

(73) Assignee: Honeywell International Inc., Morris Plains, NJ (US)

( * ) Notice: Subject to any disclaimer, the term of this patent is extended or adjusted under 35 U.S.C. 154(b) by 771 days.

(21) Appl. No.: 13/174,241

(22) Filed: Jun. 30, 2011

(65) Prior Publication Data
US 2013/0006399 A1 Jan. 3, 2013

(51) Int. Cl.
*G05B 19/042* (2006.01)
*G05B 19/05* (2006.01)

(52) U.S. Cl.
CPC ........ *G05B 19/0423* (2013.01); *G05B 19/0426* (2013.01); *G05B 19/056* (2013.01); *G05B 2219/13109* (2013.01); *G05B 2219/23077* (2013.01); *G05B 2219/23423* (2013.01); *G05B 2219/25428* (2013.01); *G05B 2219/31132* (2013.01)

(58) Field of Classification Search
CPC ...................................................... G05B 19/42
USPC ........................................... 700/9, 17, 19, 88
See application file for complete search history.

(56) References Cited

U.S. PATENT DOCUMENTS

| 5,499,188 | A | 3/1996 | Kline et al. |
| 5,903,455 | A | 5/1999 | Sharpe, Jr. et al. |
| 5,960,214 | A | 9/1999 | Sharpe, Jr. et al. |
| 5,960,441 | A | 9/1999 | Bland et al. |
| 6,279,101 | B1 | 8/2001 | Witt et al. |
| 6,317,638 | B1 | 11/2001 | Schreder et al. |
| 6,437,692 | B1 | 8/2002 | Petite et al. |
| 6,601,219 | B2 | 7/2003 | Miura et al. |
| 6,847,316 | B1 | 1/2005 | Keller |
| 7,020,876 | B1 | 3/2006 | Deitz et al. |

(Continued)

FOREIGN PATENT DOCUMENTS

| DE | 4206076 A1 | 9/1993 |
| DE | 103 14 721 A1 | 11/2004 |

(Continued)

OTHER PUBLICATIONS

Notification of transmittal of the International Search Report and the Written Opinion of the International Searching Authority, or the Declaration dated Jan. 7, 2013 in connection with International Patent Application No. PCT/US2012/043660.

(Continued)

*Primary Examiner* — Carlos Ortiz Rodriguez (57) ABSTRACT

A method includes receiving a first request to execute a field device method associated with a process control field device. The method also includes initiating actual execution of the field device method with the field device and/or simulating execution of the field device method. The method further includes recording information associated with the actual or simulated execution of the field device method and recording user input associated with the field device method. In addition, the method includes receiving a second request to play back execution of the field device method, initiating subsequent execution of the field device method, and using the recorded information and the recorded user input during the subsequent execution of the field device method.

20 Claims, 6 Drawing Sheets

(56) References Cited

U.S. PATENT DOCUMENTS

| | | | |
|---|---|---|---|
| 7,027,493 | B2 | 4/2006 | Richards |
| 7,027,954 | B2 | 4/2006 | Mets et al. |
| 7,054,695 | B2 | 5/2006 | Opheim et al. |
| 7,228,527 | B1 | 6/2007 | Phillips et al. |
| 7,369,913 | B2 | 5/2008 | Heminway et al. |
| 7,630,777 | B2 | 12/2009 | Rudnick et al. |
| 7,783,790 | B2 | 8/2010 | Meyer et al. |
| 7,876,722 | B2 | 1/2011 | Hodson et al. |
| 2002/0120671 | A1 | 8/2002 | Daffner et al. |
| 2002/0122230 | A1 | 9/2002 | Izadpanah et al. |
| 2004/0193287 | A1* | 9/2004 | Lefebvre et al. .................. 700/1 |
| 2004/0230899 | A1 | 11/2004 | Pagnano et al. |
| 2004/0259533 | A1 | 12/2004 | Nixon et al. |
| 2004/0267515 | A1 | 12/2004 | McDaniel et al. |
| 2005/0039162 | A1 | 2/2005 | Cifra |
| 2005/0049722 | A1 | 3/2005 | Kobayashi |
| 2005/0059379 | A1 | 3/2005 | Sovio et al. |
| 2005/0141553 | A1 | 6/2005 | Kim et al. |
| 2005/0164684 | A1 | 7/2005 | Chen et al. |
| 2005/0228509 | A1 | 10/2005 | James |
| 2007/0073861 | A1 | 3/2007 | Amanuddin et al. |
| 2007/0077665 | A1 | 4/2007 | Bump et al. |
| 2007/0079250 | A1 | 4/2007 | Bump et al. |
| 2007/0132779 | A1 | 6/2007 | Gilbert et al. |
| 2007/0153677 | A1 | 7/2007 | McLaughlin et al. |
| 2007/0192498 | A1 | 8/2007 | Dini et al. |
| 2008/0249641 | A1 | 10/2008 | Enver et al. |
| 2009/0093892 | A1 | 4/2009 | Kant et al. |
| 2009/0249367 | A1 | 10/2009 | Koniki et al. |
| 2009/0271726 | A1 | 10/2009 | Gavimath et al. |
| 2009/0292995 | A1 | 11/2009 | Anne et al. |
| 2010/0114347 | A1* | 5/2010 | Dheenathayalan et al. .... 700/97 |
| 2011/0054640 | A1 | 3/2011 | Law et al. |

FOREIGN PATENT DOCUMENTS

| | | | |
|---|---|---|---|
| EP | 0 962 845 | A2 | 12/1999 |
| EP | 1 401 171 | A2 | 3/2004 |
| GB | 2 427 329 | A | 12/2006 |
| WO | WO 01/35190 | A2 | 5/2001 |
| WO | WO 03/079616 | A1 | 9/2003 |
| WO | WO 2004/047385 | A2 | 6/2004 |
| WO | WO 2006/017994 | A1 | 2/2006 |
| WO | WO 2006/053041 | A1 | 5/2006 |

OTHER PUBLICATIONS

Coherent Technologies, Inc., "Batch Automation and Optimization Experience," retrieved from the web on Jan. 17, 2008, 2 pages.
ARC Advisory Group, "Rockwell Automation Process Industry Strategies," Oct. 2006, 38 pages.
Rockwell Automation, "RSBizWare, BatchCampaign," User's Guide, Aug. 2007, 71 pages.
Rockwell Automation, "RSBizWare, Batch Process Management for Batch Manufacturing," PhaseManager User's Guide, Jul. 2005, 143 pages.
International Society for Measurement and Control, "Batch Control, Part 1: Models and Terminology," Draft 12, 1994, 132 pages.
Honeywell, "TotalPlant Batch Specification and Technical Data," Release 3.0, Apr. 2002, 59 pages.
Honeywell, "TotalPlant Batch User Guide," Release 8.0, Jul. 2007, 644 pages, see esp. pp. 141-170, 177-204, 211-220, 253-266, 313-368 and 429-442.
Honeywell, "TotalPlant Batch Technical Reference," Release 8.0, Jul. 2007, 508 pages, see esp. pp. 227-264, 267-270, 293-298 & 379-402.
Honeywell, "TotalPlant Batch User Guide," Release 2.1, May 2000, 449 pages, see esp. pp. 112-132, 137-153, 157-162, 180-184, 196-235 and 280-290.
Honeywell, "TotalPlant Batch Technical Reference," Release 2.1, May 2000, 435, pages, see esp. pp. 160-187, 192-195, 214-217& 335-354.
International Search Report dated Dec. 12, 2007 in connection with PCT Application No. PCT/US2007/015376.
Written Opinion of the International Searching Authority dated Jan. 6, 2009 in connection with PCT Application No. PCT/US2007/015376.
International Search Report and Written Opinion of the International Searching Authority in PCT Application No. PCT/US2007/069717 dated Dec. 10, 2007.
International Search Report and Written Opinion of the International Searching Authority in PCT Application No. PCT/US2007/069614 dated Nov. 22, 2007.
International Search Report and Written Opinion of the International Searching Authority in PCT Application No. PCT/US2007/069710 dated Nov. 27, 2007.
International Search Report and Written Opinion of the International Searching Authority in PCT Application No. PCT/US2007/069705 dated Apr. 15, 2008.
A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.
J.M. Dias Pereira, A Fieldbus Protype for Educational Purposes, IEEE Instrumentation & Measurement Magazine, New York, NY, vol. 7, No. 1, Mar. 2004, pg. 24-31.
Namur, "NE33: Anforderungen an Systeme zur Rezeptfahrweise," Jan. 17, 2003, p. 19-30, XP002460673.
Thomas Muller-Heinzerling, et al., "Rezeptgesteuerte Fahrweise von Chargenprozessen mit BATCH X," Munchen, DE, vol. 31, Mar. 1994, p. 43-51, XP00435857.
F.G. Pfeffer, et al., "Automatisierung von Chargenprozessen mit wechselnden Rezepturen in CONTRONIC P", Munchen, DE, vol. 31, No. 8, Aug. 1989, p. 360-366, XP000053104.
Folkert Dokter, Reinfeld, "Control of batch processes with changing recipes", Munchen, DE, vol. 33, No. 1, Jan. 1991, p. 26-30, XP000179706.
Kersting, et al., "Rezeptfahrweise Chemischer Chargenprozesse: Anwendung Der Namur-Empfehlung NE 33,", Munchen, DE, vol. 37, No. 2, Feb. 1995, p. 28-38, XP000492329.
Winfried Janicke, et al., "Rechnergestutzte Systeme zur Rezeptfahrweise," Munchen, DE vol. 36, No. 10, Oct. 1994, p. 38-42, XP000484096.
Gowtham Anne, et al., "Apparatus and Method for Optimizing Maintenance and Other Operations of Field Devices in a Process Control System Using User-Defined Device Configurations", U.S. Appl. No. 12/856,526, filed Aug. 13, 2010.
Extended European Search Report dated Jun. 15, 2015 in connection with European Patent Application No. 12803629.0; 3 pages.

\* cited by examiner

APPARATUS FOR AUTOMATING FIELD DEVICE OPERATIONS BY CAPTURING DEVICE METHOD EXECUTION STEPS FOR LATER USE AND RELATED METHOD

TECHNICAL FIELD

This disclosure relates generally to process control systems. More specifically, this disclosure relates to an apparatus for automating field device operations by capturing device method execution steps for later use and related method.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

Conventional process control systems routinely include a large number of field devices, such as sensors and actuators. Communications with field devices often occur using various standard or other protocols, such as HART, FOUNDATION Fieldbus, or Control Net. These types of protocols typically support the use of device description files, which describe the online functional behavior of field devices.

A device description file can be interpreted by a host application and used to generate a user interface. The user interface allows personnel to configure and diagnose a field device. The device description file also typically contains a list of parameters supported by the field device and the methods that can be performed on the field device. A field device method is often defined in a device description file as a sequence of operations or steps to be performed during a maintenance, calibration, configuration, diagnostic, or other task. When a user invokes a field device method through the host application, the host application guides the user through each step, taking user input values as required by the method and performing the intended operations using the field device.

SUMMARY

This disclosure provides an apparatus for automating field device operations by capturing device method execution steps for later use and related method.

In a first embodiment, a method includes receiving a first request to execute a field device method associated with a process control field device. The method also includes initiating actual execution of the field device method with the field device and/or simulating execution of the field device method. The method further includes recording information associated with the actual or simulated execution of the field device method and recording user input associated with the field device method. In addition, the method includes receiving a second request to play back execution of the field device method, initiating subsequent execution of the field device method, and using the recorded information and the recorded user input during the subsequent execution of the field device method.

In a second embodiment, an apparatus includes at least one processing unit configured to receive a first request to execute a field device method associated with a process control field device. The at least one processing unit is also configured to initiate actual execution of the field device method with the field device and/or initiate simulated execution of the field device method. The at least one processing unit is further configured to record information associated with the actual or simulated execution of the field device method and record user input associated with the field device method. In addition, the at least one processing unit is configured to receive a second request to play back execution of the field device method, initiate subsequent execution of the field device method, and use the recorded information and the recorded user input during the subsequent execution of the field device method. The apparatus also includes at least one memory configured to store the recorded information and the recorded user input.

In a third embodiment, a computer readable medium embodies a computer program. The computer program includes computer readable program code for receiving a first request to execute a field device method associated with a process control field device. The computer program also includes computer readable program code for initiating actual execution of the field device method with the field device and/or simulating execution of the field device method. The computer program further includes computer readable program code for recording information associated with the actual or simulated execution of the field device method and recording user input associated with the field device method. In addition, the computer program includes computer readable program code for receiving a second request to play back execution of the field device method, initiating subsequent execution of the field device method, and using the recorded information and the recorded user input during the subsequent execution of the field device method.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
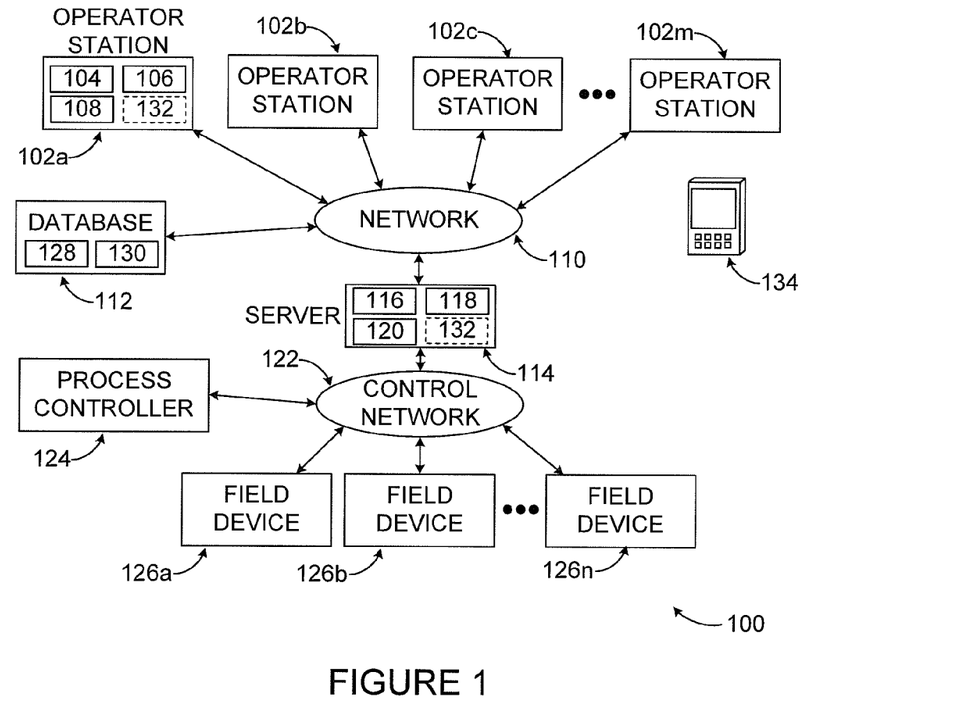
FIG. 1 illustrates an example process control system according to this disclosure.

FIG. 1 illustrates an example process control system 100 according to this disclosure. As shown in FIG. 1, the system 100 includes multiple operator stations 102*a*-102*m*, which provide users with the capability of managing or otherwise interacting with various other devices in the system 100. The operator stations 102*a*-102*m* could also provide various other capabilities, such as allowing users to configure process control strategies manually. As a particular example, the operator stations 102*a*-102*m* could display user interfaces that personnel can use to manage field devices 126*a*-126*n*. A user interface could present various screens to a user, receive user inputs, and provide responses. Each operator station 102a-102m includes any suitable structure, such as a computing device, for supporting user access or control of one or more devices. In particular embodiments, each operator station 102a-102m includes one or more processing devices 104 (such as a microprocessor, microcontroller, DSP, FPGA, or ASIC), one or more memories 106 storing instructions and data used, generated, or collected by the processing device(s), and one or more network interfaces 108 supporting communication over at least one network (such as an Ethernet interface).

A network 110 facilitates communication between various components of the system 100, such as between the operator stations 102a-102m, a database 112, and a server 114. The network 110 includes any suitable structure for facilitating communications between networked components. The network 110 could also support any suitable communication protocols or technologies, such as Ethernet, ATM, or TCP/IP.

The database 112 provides a central repository for storing information related to various devices in the system 100. For example, the database 112 could store information related to the field devices 126a-126n or maintenance schedules of the field devices 126a-126n. At least some of the stored information can be retrieved and displayed on the operator stations 102a-102m to users. The database 112 includes any suitable structure supporting the storage and retrieval of information.

The server 114 supports various functions, depending on the implementation of the system 100. For example, the server 114 can help to retrieve information from the database 112 and provide the retrieved information to the operator stations 102a-102m. The server 114 can also interface with process control components to control an industrial process based on user input from the operator stations 102a-102m. The server 114 includes any suitable computing device for executing one or more functions. In particular embodiments, the server 114 includes one or more processing devices 116, one or more memories 118 storing instructions and data used, generated, or collected by the processing device(s), and one or more network interfaces 120 supporting communication over at least one network.

A control network 122 couples the server 114 and a process controller 124 with various field devices 126a-126n. The control network 122 includes any suitable structure for facilitating communications to and from process control components. For example, the control network 122 may contain various network devices (such as multiplexors, modems, or termination panels) operating according to one or more protocols (such as HART, FOUNDATION Fieldbus, or ControlNet).

The process controller 124 can issue commands to control the operation of the field devices 126a-126n in order to implement a desired control strategy in the industrial environment being controlled. The desired control strategies could be programmed by the server 114 using control strategies that are specified in the database 112. Inputs received from operator stations 102a-102m could be used to select and modify the control strategies. The process controller 124 may also receive various status information from the field devices 126a-126n, which are used in various decision points (such as IF conditions) within a control strategy. The process controller 124 includes any suitable structure for implementing one or more control strategies.

The field devices 126a-126n can implement a wide variety of functions in a process control system to monitor or control an industrial process. For example, the field devices 126a-126n could represent sensors measuring various process variables (such as temperature or pressure sensors). The field devices 126a-126n could also represent actuators for altering operation of an industrial process (such as valves). The field devices 126a-126n could further represent relays or any other devices that perform various operations under the control of a process controller.

As noted above, each field device's manufacturer or vendor may provide a device description file 128 for that field device 126a-126n. A device description file 128 represents a machine-readable file containing information relating to a field device and its capabilities. The device capabilities can include the manner in which the field device may behave in different conditions, management commands that can be sent to the field device, and status information or results of execution of management commands that can be viewed. As particular examples, the information could include:

information about device parameters (such as codings, names, engineering units, and how to display the parameters);
an arrangement of the parameters in a menu structure;
names of menus and submenus;
information about operating interactions (device methods), such as maintenance, calibration, configuration, and diagnostic methods; and
information about visualization tools, such as charts and graphs.

In particular embodiments, the device description files 128 can be stored in the database 112. Note, however, that the device description files 128 could be stored at any other suitable location(s) and in any other suitable storage device(s), such as on a removable storage device like a Flash memory or at a manufacturer or vendor's web server and downloaded through a communication link.

The device description files 128 represent any suitable files describing field devices 126a-126n. The device description files 128 could, for example, include DD (device description) files, EDD (electronic device description) files, CFF (Common File Format) files, value files, or any other auxiliary data source pertaining to a field device. These types of files or other data structures are collectively referred to as "device description files."

The server 114 can receive commands from the operator stations 102a-102m related to setting up, configuring, utilizing, and monitoring of the field devices 126a-126, and the server 114 can execute the corresponding actions. For example, utilizing a sensor field device may require the server 114 to (i) receive the parameters being measured by the field device using the process controller 124 via the control network 122 and (ii) return the information to the operator station that issued a status request command or other command. Data in the database 112 may also be retrieved and returned to the application that issued a command in response to corresponding command types.

As noted above, the operator stations 102a-102m can display user interfaces that allow personnel to interact with and monitor the field devices 126a-126n. For example, a host application executed by the server 114 could load the device description file 128 for a field device, use the device description file 128 to create the user interface, and provide the user interface to the operation station for display. A user at the operator station can use screens of the user interface to interact with and manage the field device. In particular embodiments, the host application could represent the FIELD DEVICE MANAGER (FDM) from HONEYWELL INTERNATIONAL INC.

In conventional systems, when the host application loads a device description file 128, the user is able to select a particular device method to be executed using the field device. A device method is often defined in a device description file as a sequence of operations or steps to be performed during a maintenance, calibration, configuration, diagnostic, or other task. For example, a "Step Test" device method could define the sequence of operations to position a valve in steps, where the steps are specified by a user.

When a user invokes a device method through the host application, the host application guides the user through each step of the method, taking user input values as required by the steps and performing the intended operations using the field device. These device methods could be frequently executed by users in order to perform various maintenance and other operations on the field devices. Each time a user executes a device method, the user has to go through each step, enter any necessary values, and acknowledge the completion of each step. Many of these device methods are executed with the same set of inputs at regular intervals as part of a maintenance cycle.

In accordance with this disclosure, the system 100 supports a mechanism to automate field device method execution. In some embodiments, this mechanism can be used in either an online mode or an offline mode. Note that a particular implementation could support the use of one mode or both modes.

In the online mode, when a field device 126a-126n is online and a user invokes a field device method, the host application or other unit can capture each step of the method as the user provides input data and acknowledges the completion of each step. Once the execution data is captured, the data can be stored, such as in the database 112 as a stored method execution file 130. Later, a user or an automated system can select the same field device (or any field device of the same type) and request that the host application perform the same field device method using the captured data. This may be referred to as a playback of the method execution. The host application can retrieve the relevant method execution file 130, perform the device method using the stored data, and provide the result of each step during the method execution.

in the offline mode (such as when a field device is not yet available in the system 100), a user can invoke simulated execution of a field device method using emulation of the field device, and the method steps performed during the emulation along with the user's input are captured and stored. Once the field device is available in the system 100, the user can invoke execution of the field device method on the physical device using the captured data during a playback of the method execution.

During the playback of a recorded method execution, the host application can determine if there is any deviation during the method execution steps. In other words, the host application can determine whether the current execution of the field device method differs from the recorded execution. This deviation could be due to a number of factors, such as a change in the condition of the field device. If this occurs, the automatic execution can be stopped, and the user can be notified of the deviation. For example, if a step during method execution fails because of a defect in a field device, the automatic execution can stop instead of proceeding with the remaining steps.

In both the online and offline techniques, this mechanism can help to reduce or even eliminate user intervention during playback of a recorded method execution. For instance, this can reduce or eliminate the need for a user to repeatedly enter the same input values. As a particular example, a loop test could be performed using all similar field devices without having to reenter the input data for each field device.

In addition, the host application itself or another component could provide scheduling capabilities, where users can schedule execution of field device methods using playback of recorded method executions. For example, a user could schedule maintenance methods to be performed at specified intervals, and the host application can initiate execution of those methods using the captured data. The scheduled execution could be fully automatic or semi-automatic (such as when a user gets informed on the schedule but needs to initiate the playback). Manual playback where the user manually initiates the playback on a schedule or at other times could also be supported. Of course, various ones of these options can be used with multiple devices.

Note that various options exist for recording and using data during method execution. For example, as described above; a user's input data during method execution or simulation can be captured along with data defining the method progression. The user input data could be stored with the data defining the method progression. The user input data could also be stored separate from the data defining the method progression. The separate input data could then be imported into the host application or other application, optionally edited, and used during method playback. As another example, as described above, the user's input data and the data defining the method progression can be used during method playback. The system could capture multiple sets of user input data, or the user could define one or more sets of user input data (such as in text files or MICROSOFT EXCEL spreadsheet files). The user could then have the option of playing back the method execution with a specific set of stored input data. The user could also be given the option of playing back the method execution using the data defining the method progression but without any stored user input data. In this case, the user could provide input data during method playback. These are simply some examples of the ways in which method execution recording and playback could occur.

This mechanism could be implemented in any suitable manner. For example, this functionality could be implemented by executing at least one software application 132. The application 132 could be executed by any suitable device(s) within or associated with the system 100, such as one or more operator stations 102a-102m, the server 114, or other device(s). The application 132 could be integrated within the host application, used in conjunction with the host application, or used separate from the host application. In particular embodiments, the application 132 could support the use of a graphical user interface that allows users to invoke methods involving the field devices 126a-126n, provide input values during those methods, record method executions, and play back recorded method executions. The application 132 can include any additional functionality. Note that while the use of an application 132 having software is described here, the same functionality could be implemented using only hardware or a combination of hardware and software/firmware. Additional details regarding the recording and playback of field device method executions are provided below.

Note that while the use of operator stations 102a-102m in conjunction with the application 132 is described here, the application 132 could be used in conjunction with any other suitable devices. For example, users could invoke method execution recording or playback using one or more portable devices 134, such as portable wireless or wired devices. Each portable device 134 could communicate in either a wired or wireless manner with the server 114, the operator stations 102a-102m, the process controller 124, or any other or additional components in the system 100. The portable device 134 could retrieve information from the field devices 126a-126n and provide the information to a user via user interfaces. Each portable device 134 could represent any suitable handheld or other portable device that can facilitate recording or playback of field device method execution. As a particular example, a portable device 134 could be used by maintenance or other personnel to perform specialized maintenance or other operations.

Although FIG. 1 illustrates one example of a process control system 100, various changes may be made to FIG. 1. For example, the process control system 100 could include any number of field devices, networks, servers, operator stations, control system components, databases, and portable devices. Also, the makeup and arrangement of the system 100 is for illustration only. In addition, FIG. 1 illustrates one example operational environment in which the recording and playback of field device method execution can be used. This functionality could be used in any suitable system.

Figure 2:
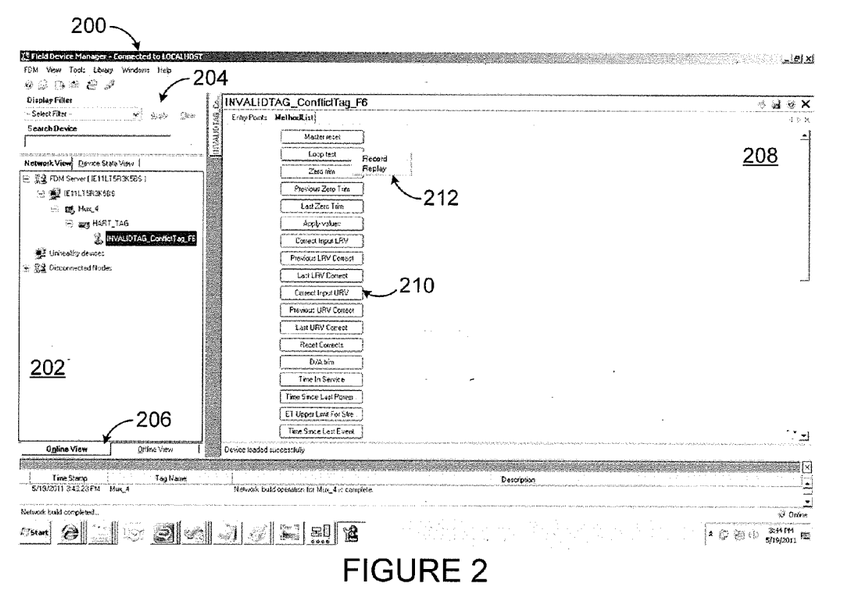
FIGS. 2 through 7 illustrate an example interface for automating field device operations by capturing method execution steps for later use according to this disclosure.

FIGS. 2 through 7 illustrate an example interface 200 for automating field device operations by capturing method execution steps for later use according to this disclosure. As shown in FIG. 2, the interface 200 includes a device selection panel 202, which allows a user to view different field devices within a system and to select one of the field devices. The selected field device could be an online device or an offline device. In this example, the user is able to filter the displayed field devices, search for field devices, and select different views of the field devices using controls 204. One view of the field devices is a hierarchical network view based on the arrangement of a control network, and another view of the field devices is a state view based on the operational states of the field devices. Controls 206 allow a user to view online and offline field devices.

When a field device is selected in the device selection panel 202, information about that field device is presented in a device data area 208. In this example, the device data area 208 includes a set of buttons 210, each associated with a different field device method that can be selected by a user for execution. If the selected field device is online, selection of a button 210 can invoke execution of the associated method on the field device. If the selected field device is offline, selection of a button 210 can invoke simulated execution of the associated method using the field device's description file 128.

If a user simply selects a button 210, the field device method associated with that button 210 is executed normally (without recording or playback), either in an actual or simulated manner. However, a user could also cause a pop-up menu 212 to appear, such as by "right-clicking" on a button 210. The pop-up menu 212 allows the user to select whether to execute a field device method while recording the execution. The pop-up menu 212 also allows the user to select whether to play back execution of a field device method using stored data.

Figure 3:
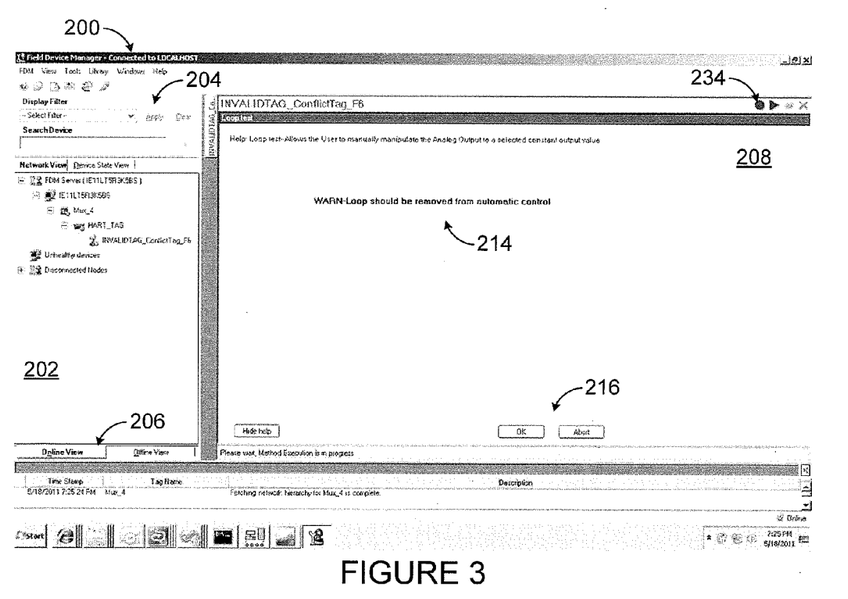

Assume that a user selects a particular field device method for normal execution (without recording or playback). FIGS. 3 through 6 illustrate how the interface 200 can be used to support execution of a particular field device method, namely a loop test. As shown in FIG. 3, a loop test allows a user to manually enter a value for an analog output variable. An industrial process is then controlled so that the analog output variable reaches the specified value. In FIG. 3, the device data area 208 includes a warning 214 instructing the user to remove a loop from automatic control, which is done to prevent a controller from attempting to alter the analog output variable. Buttons 216 allow the user to proceed with or stop the method execution.

Figure 4:
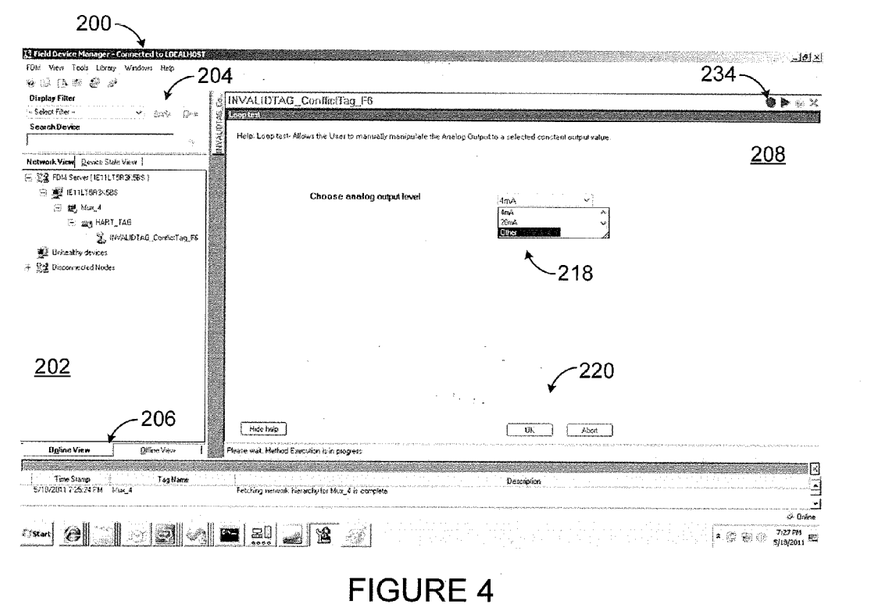

If the user selects to proceed, the device data area 208 presents the user with a control 218 for selecting a value of the analog output variable as shown in FIG. 4. In this case, the control 218 represents a drop-down menu, although any other suitable mechanism could be used. Here, the user selects a value for the analog output variable other than two predefined values. Buttons 220 allow the user to proceed with or stop the method execution.

Figure 5:
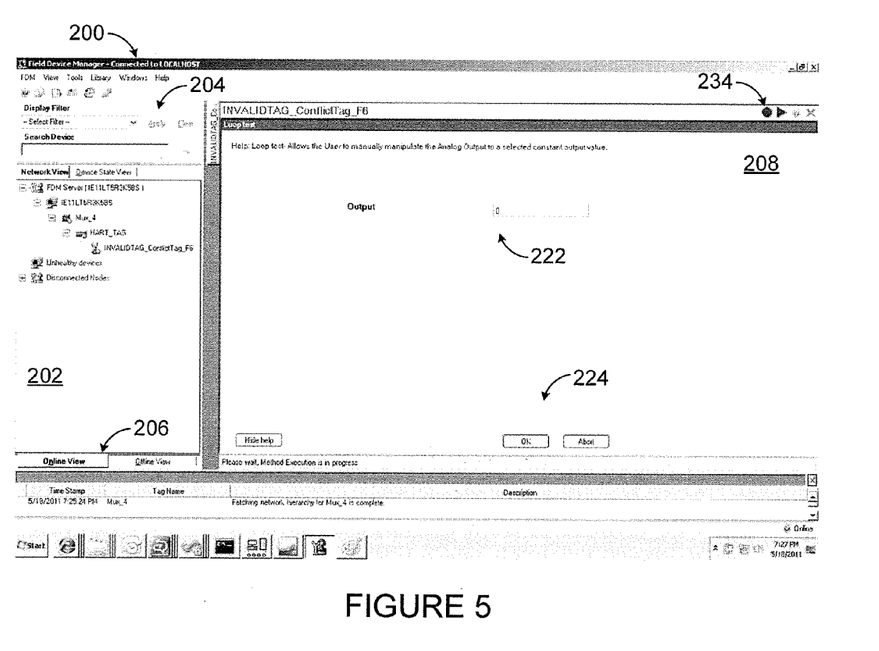

Since the user selects a value for the analog output variable other than the predefined values, the device data area 208 presents the user with a text box 222 for specifying the value for the analog output variable as shown in FIG. 5. Note that logic can be used to verify any data value entered in the text box 222, such as by ensuring that the data value falls within a range of acceptable or possible values. Buttons 224 allow the user to proceed with or stop the method execution.

Figure 6:
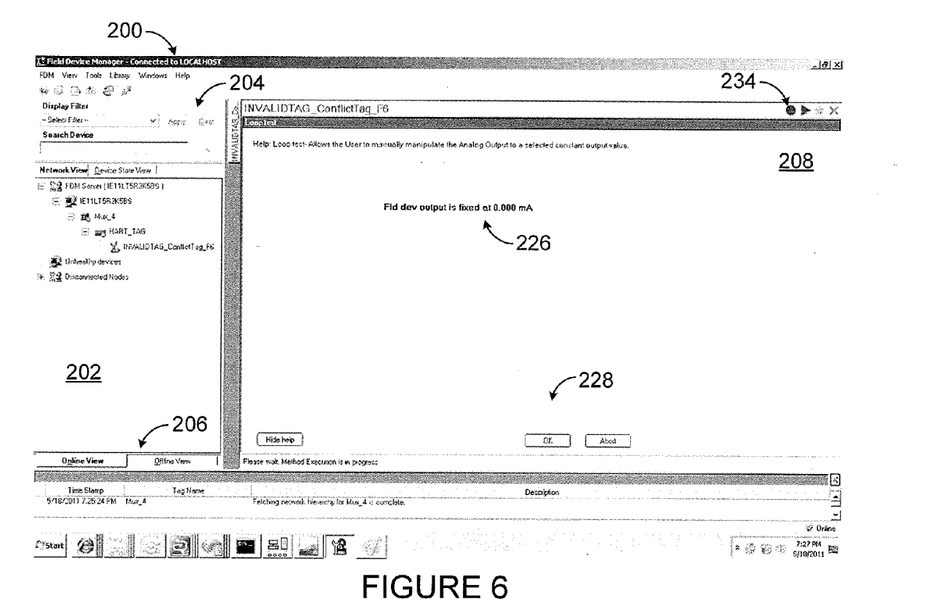
Figure 7:
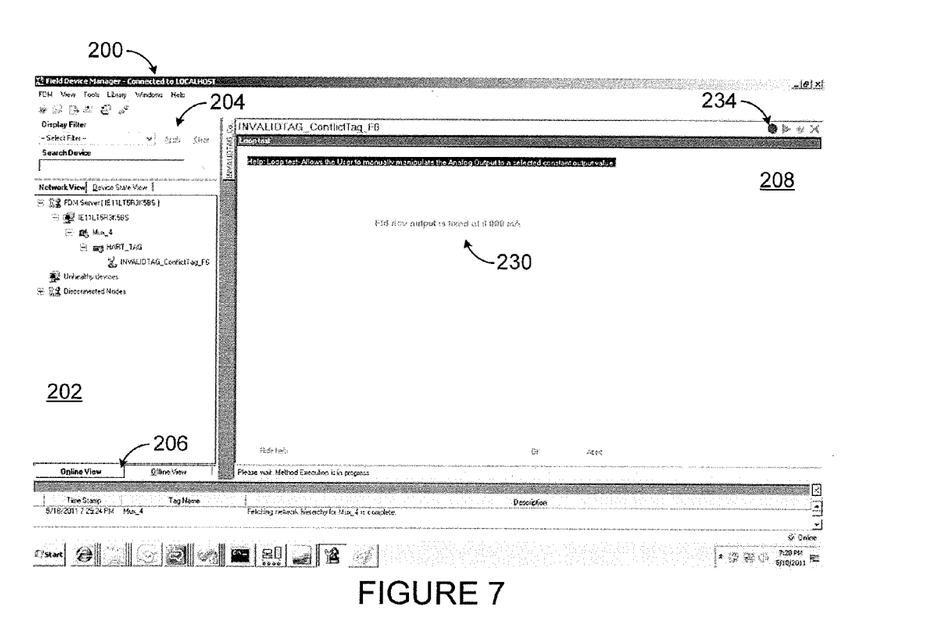

Once the user selects to proceed from FIG. 5, the device data area 208 presents a notification 226 as shown in FIG. 6. The notification 226 in this case indicates that the field device is going to be controlled to have an output equal to the user-specified value. Buttons 228 allow the user to proceed with or stop the method execution. If the user elects to proceed, the device data area 208 presents a notification 230 as shown in FIG. 7. The notification 230 in this case provides an indication of the actual value of the analog output variable. As can be seen here, the actual value of the analog output variable matches the user-specified value, indicating that the field device passes the loop test.

Note that the interface 200 in FIGS. 3 through 7 includes a control panel 234. The control panel 234 here includes record (circle), playback (triangle), help (question mark), and close (X) buttons. Other buttons could also be provided, such as a stop button for stopping the recording or playback of a method. During normal method execution, the record and playback buttons could be darkened or otherwise made to indicate that recording and playback are not occurring.

Returning to FIG. 2, assume the user selects to record the field device method execution using the pop-up menu 212. In this case, the same process shown in FIGS. 3 through 7 could occur, with the user providing inputs through the interface 200 and indicating that each step can proceed. During this time, the user's inputs could be recorded and stored in a method execution file 130, separately or with information defining how the method execution progresses (such as the progression of the method steps). Also, the record button in the control panel 234 could be illuminated, informing the user that the method execution is being recorded. Recording of the method execution can stop when the method completes. The close button can be used to close the form shown in FIG. 2.

Again returning to FIG. 2, assume the user selects to play back the field device method execution using the pop-up menu 212. In this case, data associated with a recorded method execution can be retrieved from a method execution file 130. Also, as noted above, if multiple sets of user input data are defined for that method, the user could select a particular input data set for use. The process shown in FIGS. 3 through 7 could then occur, except that the user is not required to provide inputs to the field device method. Rather, the stored inputs from the process execution file 130 or other location can be provided to the host application during method execution. In this case, the user could view the interface 200 and watch the method execution occur. Playback of the method execution could stop when the method completes. However, as described above, the user could provide user inputs during playback of the method.

Note that during playback, the execution of a field device method may differ from the recorded execution. For instance, a different input may be required, or a different notification may be presented. If this occurs, playback of the recorded method may stop, and the user could be notified. For instance, the device data area 208 could provide an indicator identifying the interrupted method execution and a reason for the interruption. The user could then use the interface 200 to provide the necessary input, review the notification, or take any other suitable action. The user could then resume playback of the recorded method, such as by selecting the play button in the control panel 234.

Although FIGS. 2 through 7 illustrate one example of an interface 200 for automating field device operations by capturing method execution steps for later use, various changes may be made to FIGS. 2 through 7. For example, each screen shown in FIGS. 2 through 7 could have any other layout or design, and each screen could include any other or additional information according to particular needs. Also, while various input or output mechanisms (such as pop-up menus, text boxes, drop-down menus, and textual notifications) are shown and described above, any other or additional input or output mechanisms could be used to provide information to or receive information from a user.

Figure 8A:
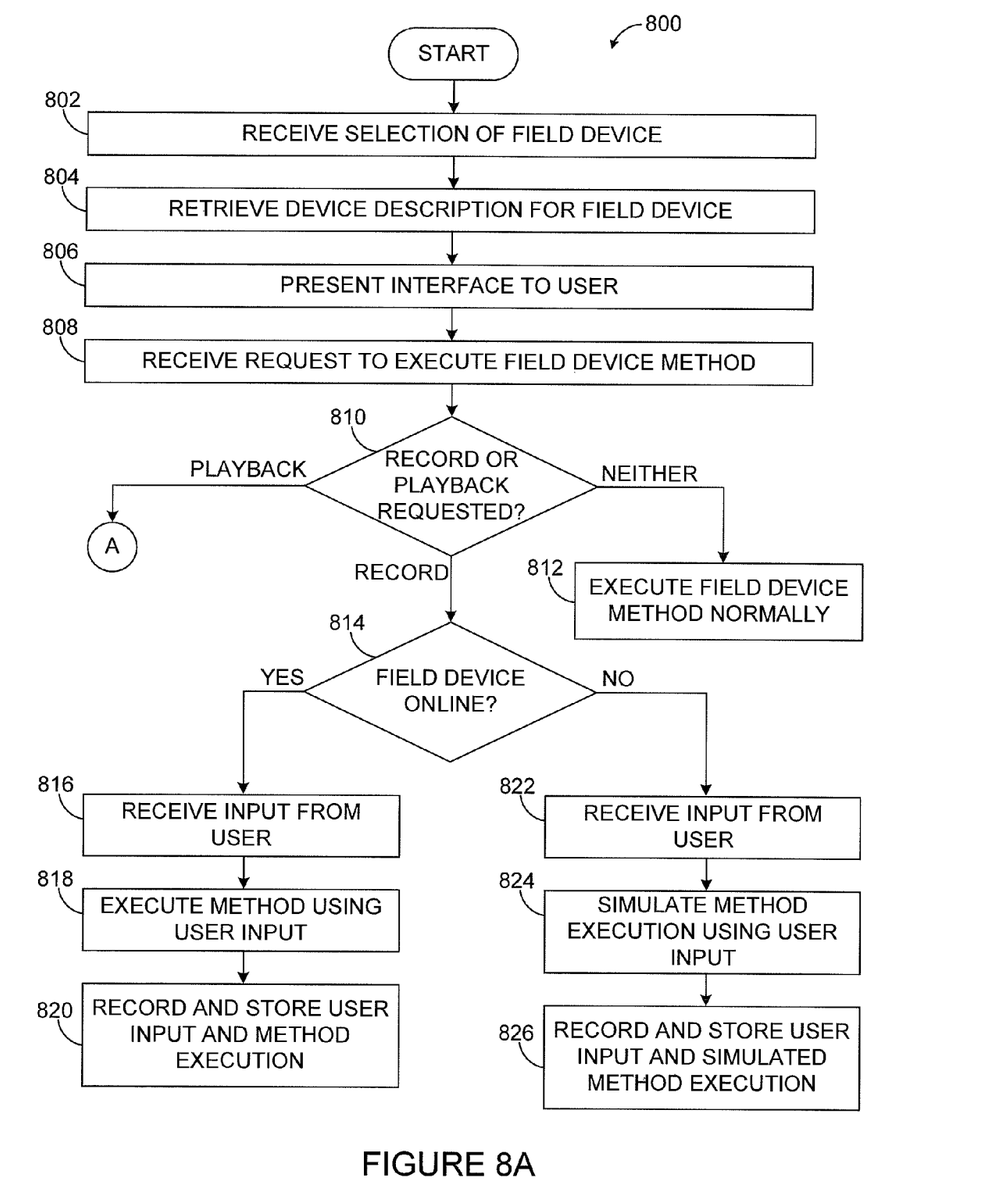
FIGS. 8A and 8B illustrate an example method for automating field device operations by capturing field device method execution steps for later use according to this disclosure.
Figure 8B:
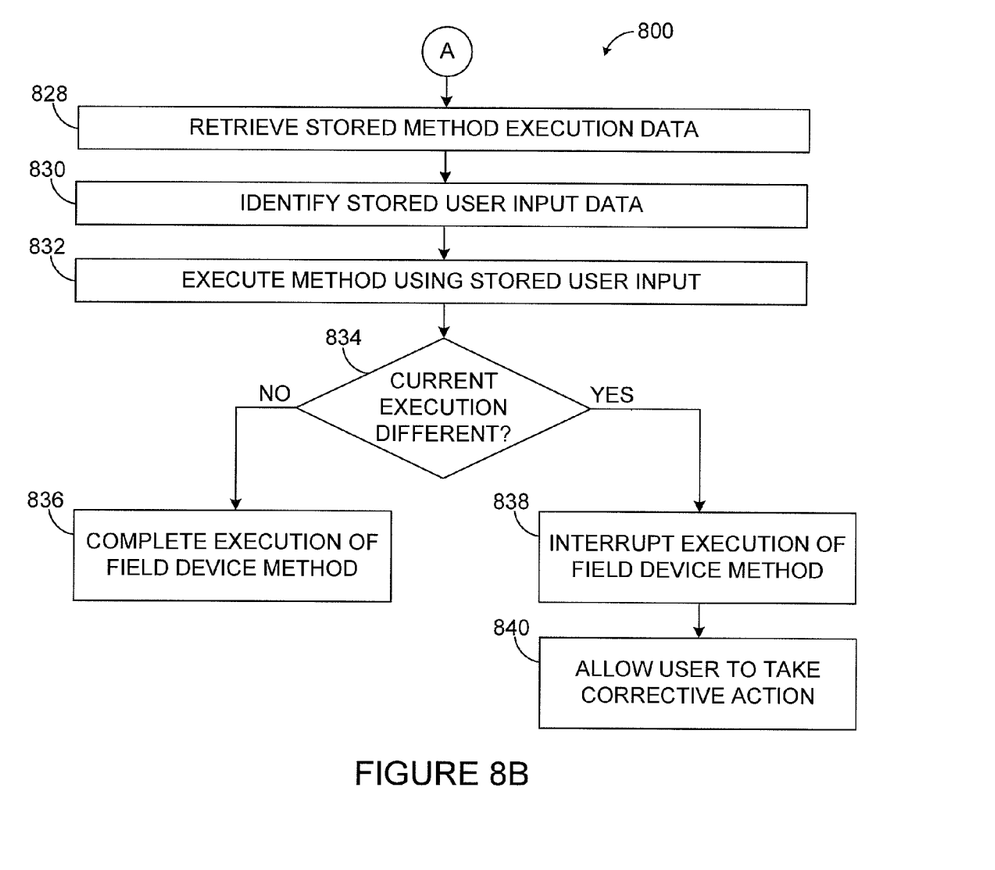

FIGS. 8A and 8B illustrate an example method 800 for automating field device operations by capturing field device method execution steps for later use according to this disclosure. A field device is selected at step 802. This could include, for example, a user selecting a field device using a FIELD DEVICE MANAGER or other host application. A device description for the field device is retrieved at step 804, and an interface is generated and presented to the user at step 806. This could include, for example, the host application retrieving a DD/EDD file or other device description file 128 from a database 112 or other location. This could also include the host application generating a GUI (such as the interface 200) using the device description file 128 and sending the GUI for display on an operator station or portable device.

A request to execute a field device method is received at step 808. This could include, for example, the user selecting a button 210 in the interface 200. A determination is made whether the user is requesting recording or playback of method execution at step 810. If neither is selected, the field device method is executed normally at step 812. This could include, for example, the user using the interface 200 to provide inputs to the host application, initiate steps of the invoked field device method, and review notifications from the host application.

If recording of method execution is selected, a determination is made whether the field device is online at step 814. This could include, for example, the host application determining whether the field device is accessible on a network. If the field device is online, inputs are received from the user at step 816, and the method is executed using the user input at step 818. During this time, the user's inputs and details of the method execution can be stored at step 820. This could include, for example, storing this data separately or together in one or more method execution files 130. If the field device is offline, input is received from the user at step 822, and execution of the method is simulated using the user input at step 824. The simulated execution may be based on the device description file 128. Again, the user's inputs and details of the simulated method execution can be stored at step 826.

If playback of method execution is selected, stored method execution data is retrieved at step 828. This could include, for example, retrieving data associated with a prior recorded method execution from a method execution file 130, such as data defining the method progression. Stored user inputs are identified at step 830. The user inputs could form part of the retrieved method execution data (such as the method execution file 130) or stored separately. The field device method is executed at step 832. This could include, for example, the host application generating the interface 200 and presenting the interface 200 to the user. The host application can use the identified user inputs during the execution of the method.

A determination is made whether the current method execution differs from the recorded method execution at step 834. If not, the method execution is completed during playback at step 836. At this point, the user can take any suitable action, such as invoking execution of another method on the same or different field device. If the current method execution differs from the recorded method execution, the current method execution is interrupted at step 838, and the user is allowed to take corrective action at step 840. This could include, for example, notifying the user of the difference in execution. This may also include allowing the user to provide any necessary inputs, review any different notifications, or re-invoke playback of method execution.

After playback of a method, a report could optionally be generated summarizing the automated execution. For example, the summary could identify the success or failure of the playback of the recorded method. The summary could also identify any differences between the playback of the recorded method and the recorded execution of that method.

Although FIGS. 8A and 8B illustrate one example of a method 800 for automating field device operations by capturing field device method execution steps for later use, various changes may be made to FIGS. 8A and 8B. For example, while shown as a series of steps, the steps in each figure could overlap, occur in parallel, occur in a different order, or occur multiple times.

Note that in the above description, the recording of user input has been described as occurring during the actual or simulated execution of a field device method. However, other embodiments could record the user input separately from recording other information about the method. For example, a method could be executed or simulated in order to identify the progression of the method, but user data provided at that time may not be recorded. Rather, the user data could be recorded separately, such as by allowing a user to define a text file or other file containing the input. As another example, a method could be executed or simulated in order to identify the progression of the method, and user data provided at that time may be recorded. At a later date, however, it may be determined that the user data should be changed, and the recorded user data can be altered. In other words, the mechanism for automated method execution described here could be used with any technique for collecting method-progression information and any technique for collecting user data.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory ("ROM"), random access memory ("RAM"), a hard disk drive, a compact disc ("CD"), a digital video disc ("DVD"), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a first request to execute a field device method associated with a first process control field device;
   at least one of initiating actual execution of the field device method with the first field device and simulating execution of the field device method;
   recording information associated with a progression of the actual or simulated execution of the field device method;
   recording user input associated with the field device method;
   receiving a second request to play back execution of the field device method;
   initiating subsequent execution of the field device method with a second process control field device and using the recorded information and the recorded user input during the subsequent execution of the field device method, the second field device of a same type as the first field device;
   determining that the subsequent execution of the field device method differs from the progression of the actual or simulated execution of the field device method; and
   in response to the determination, interrupting the subsequent execution of the field device method, receiving additional user input, and resuming the subsequent execution of the field device method using the additional user input.

2. The method of claim 1, wherein initiating the actual or simulated execution of the field device method comprises:
   determining whether the first field device is online;
   initiating actual execution of the field device method when the first field device is online; and
   initiating simulated execution of the field device method when the first field device is offline.

3. The method of claim 2, wherein:
   initiating the simulated execution of the field device method comprises using a device description file associated with the first field device; and
   the device description file comprises information identifying the first field device and capabilities of the first field device.

4. The method of claim 1, wherein recording the information comprises recording a progression of method steps during the actual or simulated execution of the field device method.

5. The method of claim 1, wherein recording the user input associated with the field device method comprises recording user input provided during the actual or simulated execution of the field device method.

6. The method of claim 1, wherein:
   recording the user input associated with the field device method comprises receiving and storing user input data in one or more files, wherein the user input data is received and stored at a time when the actual or simulated execution of the field device method is not occurring; and
   initiating the subsequent execution of the field device method comprises receiving information identifying the file containing the stored user input data to be used during the subsequent execution of the field device method.

7. The method of claim 1, further comprising:
   generating a summary of the subsequent execution of the field device method, the summary identifying a success or failure of the subsequent execution and any differences between the actual or simulated execution of the field device method and the subsequent execution of the field device method.

8. The method of claim 1, further comprising:
   repeatedly generating the second request to play back execution of the field device method in accordance with a schedule, the schedule identifying multiple times at which the field device method is to be executed.

9. The method of claim 8, wherein the schedule identifies multiple times at which the field device method is to be executed using multiple second field devices.

10. The method of claim 1, further comprising:
    recording multiple sets of user inputs associated with multiple actual or simulated executions of the field device method; and
    receiving a selection of one of the sets of user inputs;
    wherein the selected set of user inputs is used during the subsequent execution of the field device method.

11. The method of claim 1, wherein:
    recording the user input associated with the field device method occurs during one of:
    the actual execution, and
    the simulated execution of the field device method; and
    the information associated with the progression includes information associated with the progression of the actual or simulated execution of the field device method.

12. An apparatus comprising:
    at least one processing device configured to:
    receive a first request to execute a field device method associated with a first process control field device;
    at least one of initiate actual execution of the field device method with the first field device and initiate simulated execution of the field device method;
    record information associated with a progression of the actual or simulated execution of the field device method;
    record user input associated with the field device method;
    receive a second request to play back execution of the field device method;
    initiate subsequent execution of the field device method with a second process control field device and use the recorded information and the recorded user input during the subsequent execution of the field device method, the second field device of a same type as the first field device;

determine that the subsequent execution of the field device method differs from the progression of the actual or simulated execution of the field device method; and in response to the determination, interrupt the subsequent execution of the field device method, receive additional user input, and resume the subsequent execution of the field device method using the additional user input; and at least one memory configured to store the recorded information and the recorded user input.

13. The apparatus of claim 12, wherein the at least one processing device is configured to initiate the actual or simulated execution of the field device method by:

determining whether the first field device is online;

initiating actual execution of the field device method when the first field device is online; and initiating simulated execution of the field device method when the first field device is offline.

14. The apparatus of claim 13, wherein:

the at least one processing device is configured to simulate the execution of the field device method using a device description file associated with the first field device; and the device description file comprises information identifying the first field device and capabilities of the first field device.

15. The apparatus of claim 12, wherein the at least one processing device is configured to record the information by recording a progression of method steps during the actual or simulated execution of the field device method.

16. The apparatus of claim 12, wherein the at least one processing device is further configured to generate a graphical user interface for presentation to a user, the graphical user interface configured to receive the user input.

17. The system of claim 16, wherein the graphical user interface is configured to initiate normal execution of the field device method, initiate recorded execution of the field device method, and initiate playback of the recorded execution of the field device method.

18. A non-transitory computer readable medium embodying a computer program, the computer program comprising computer readable program code for:

receiving a first request to execute a field device method associated with a first process control field device;

at least one of initiating actual execution of the field device method with the first field device and simulating execution of the field device method;

recording information associated with a progression of the actual or simulated execution of the field device method;

recording user input associated with the field device method;

receiving a second request to play back execution of the field device method;

initiating subsequent execution of the field device method with a second process control field device and using the recorded information and the recorded user input during the subsequent execution of the field device method, the second field device of a same type as the first field device;

determining that the subsequent execution of the field device method differs from the progression of the actual or simulated execution of the field device method; and in response to the determination, interrupting the subsequent execution of the field device method, receiving additional user input, and resuming the subsequent execution of the field device method using the additional user input.

19. The computer readable medium of claim 18, wherein the computer readable program code for initiating the actual or simulated execution of the field device method comprises computer readable program code for:

determining whether the first field device is online;

initiating actual execution of the field device method when the first field device is online; and initiating simulated execution of the field device method when the first field device is offline.

20. The computer readable medium of claim 18, wherein the computer readable program code for recording the information comprises computer readable program code for recording a progression of method steps during the actual or simulated execution of the field device method.

* * * * *